United States Patent
Murphy et al.

(10) Patent No.: US 7,658,444 B2
(45) Date of Patent: Feb. 9, 2010

(54) ENERGY ABSORBING SEAT ANCHOR RESTRAINT SYSTEM FOR CHILD SAFETY SEATS

(75) Inventors: Mark Murphy, Livonia, MI (US); Reddy Malapati, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 11/608,694

(22) Filed: Dec. 8, 2006

(65) Prior Publication Data

US 2008/0136223 A1 Jun. 12, 2008

(51) Int. Cl.
*B60N 2/42* (2006.01)

(52) U.S. Cl. .................. 297/216.11; 297/472

(58) Field of Classification Search ........... 297/216.11, 297/472
See application file for complete search history.

(56) References Cited

U.S. PATENT DOCUMENTS

| | | |
|---|---|---|
| 3,106,989 A | 10/1963 | Fuchs |
| 3,198,288 A | 8/1965 | Presunka |
| 3,547,468 A | 12/1970 | Giuffrida |
| 3,973,650 A | 8/1976 | Nagazumi |
| 4,358,136 A | 11/1982 | Tsuge et al. |
| 5,639,144 A | 6/1997 | Naujokas |
| 5,738,377 A * | 4/1998 | Sugiki et al. .............. 280/777 |
| 6,394,241 B1 * | 5/2002 | Desjardins et al. ...... 297/472 X |
| 6,485,055 B1 | 11/2002 | Swayne et al. |
| 6,517,154 B2 | 2/2003 | Sawamoto |
| 6,767,057 B2 | 7/2004 | Neelis |
| 2002/0043830 A1 | 4/2002 | Sawamoto |
| 2004/0051356 A1 | 3/2004 | Neelis |
| 2004/0095004 A1 | 5/2004 | Horton et al. |
| 2005/0217608 A1 | 10/2005 | Johnson et al. |
| 2006/0049622 A1 | 3/2006 | Yamamoto |

FOREIGN PATENT DOCUMENTS

| | | |
|---|---|---|
| DE | 2637406 | 3/1977 |
| EP | 1094240 | 4/2006 |
| GB | 1390889 | 4/1975 |
| JP | 2005231453 | 2/2005 |
| WO | 9620853 | 7/1996 |
| WO | 01/46601 | 6/2001 |
| WO | 2005/058635 | 6/2005 |

* cited by examiner

*Primary Examiner*—Anthony D Barfield
(74) *Attorney, Agent, or Firm*—Frederick Owens; Alleman Hall McCoy Russell & Tuttle LLP

(57) ABSTRACT

An energy-absorbing deformable structure to attach a child safety seat to a mounting portion of a vehicle comprises a bracket. The bracket includes a base configured to be coupled to the mounting portion of the vehicle, a metal strap positioned in the base such that a first end of the metal strap is configured to be free and coupled to the child safety seat, a second end of the metal strap is separably attached to the base, and a body of the metal strap is bent between the first end and the second end. When the metal strap is pulled in tension, the metal strap tears from the base, thereby absorbing energy.

11 Claims, 3 Drawing Sheets

ENERGY ABSORBING SEAT ANCHOR RESTRAINT SYSTEM FOR CHILD SAFETY SEATS

FIELD OF INVENTION

The present application relates to an energy absorbing seat anchor restraint system for child seats.

BACKGROUND

To meet Federal Motor Vehicle Safety Standards, a vehicle may include an upper anchor attachment to receive a child safety seat tether hook connected to an upper portion of the child safety seat back. The connection of the upper portion of the child safety seat to the vehicle may reduce the forward movement of the child safety seat during a frontal crash. However, the shock applied by child safety seat restraining equipment to the child safety seat occupant may increase in the case of a forward vehicle collision.

One approach to reduce the impact of the collision force to the child safety seat is described in the U.S. Pat. No. 6,767,057. In particular, anchor attachments to the child safety seat with energy absorbing mechanisms are disclosed. In one example, the upper anchorage assembly includes a steel U-shaped bracket with a first end secured to the vehicle horizontally and a second end having a latchable portion for releasable engagement with the corresponding upper child seat latch. If the predetermined forward force is exceeded, the U-shaped bracket bends forward and is deformed. The deformation of the bracket absorbs energy.

However, the inventors herein have recognized disadvantages with such an energy absorbing device. Specifically, the steel U-shaped bracket may not maintain desired loads under a range of impact force to the child safety seat, because movement and deformation of the U-shaped bracket may be unpredictable during collusion. As a result, insufficient force may be absorbed by the U-shaped bracket.

SUMMARY OF THE INVENTION

According to one aspect, the above issues may be addressed by an energy-absorbing deformable structure that is configured to attach a child safety seat to a mounting portion of a vehicle. The energy-absorbing deformable structure comprises a bracket including a base configured to be coupled to the mounting portion of the vehicle, a metal strap positioned in the base such that a first end of the metal strap is configured to be free and coupled to the child safety seat, a second end of the metal strap is separably attached to the base, and a body of the metal strap is bent between the first end and the second end; wherein, when the metal strap is pulled in tension, the metal strap tears from the base, thereby absorbing energy.

According to another aspect, a child safety seat restraint system of a vehicle comprises a tether have a first end attached to a child safety seat and a second end with a latchable structure; and an energy absorbing anchor including a base having a front end, a rear end and two substantially parallel grooves; a tab between the two grooves wherein the tab includes a coupling structure at the rear end to be coupled to the latchable structure of the tether; wherein, when the tab is pulled in tension, the tab is torn off from the grooves, thereby absorbing energy.

In this way, the energy-absorbing anchor can be adapted to different load requirements because a bond between the metal strap or tab and the base can be configured to achieve a desired load in a controlled manner.

DETAILED DESCRIPTION OF THE PREFERRED EMBODIMENTS

Figure 1:
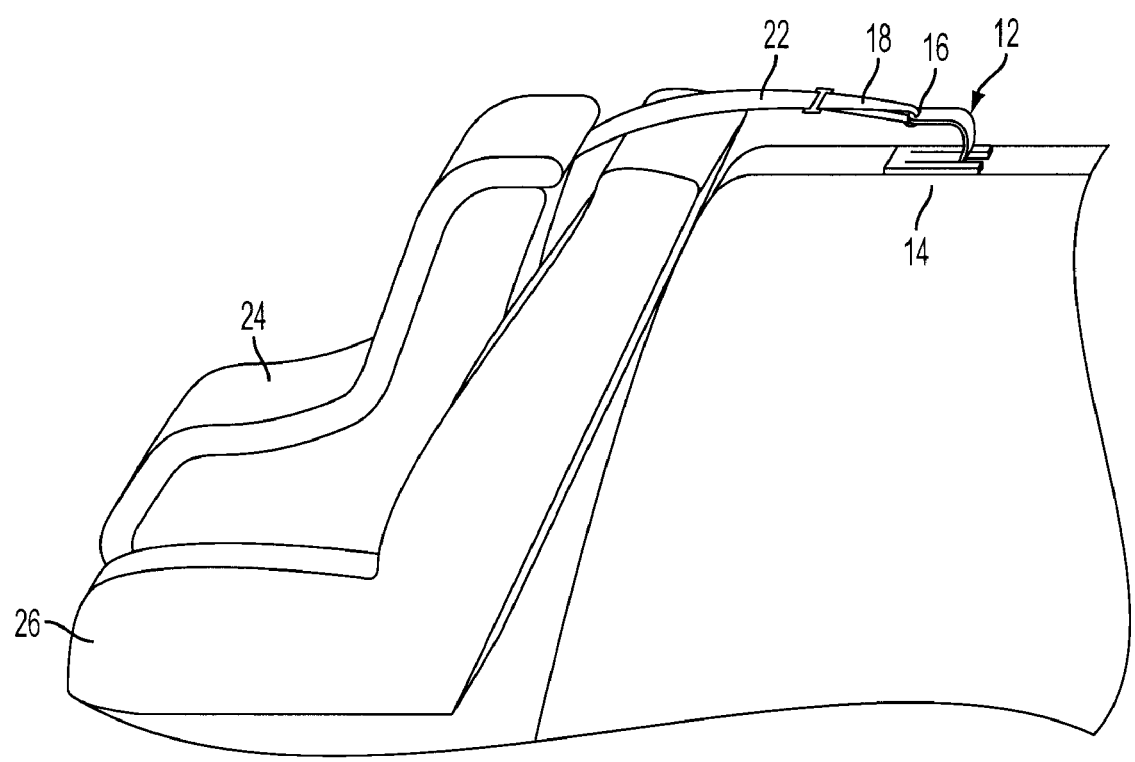
FIG. 1 is a perspective view of an exemplary embodiment of an energy-absorbing anchor for securing a child safety seat to a vehicle, schematically illustrating a coupling of the energy-absorbing anchor to a tether of the child safety seat and to a mounting portion of the vehicle.

FIG. 1 shows a perspective view of an exemplary energy-absorbing anchor used in an upper anchorage of a child safety seat restraint system of a vehicle. As shown in FIG. 1, energy-absorbing anchor 12 is secured to a mounting portion 14 of the vehicle. In the depicted embodiment, the mounting portion 14 is located on a package tray of the vehicle. A coupling portion 16 of energy-absorbing anchor 12 is coupled to a latchable portion 18 of an upper tether 22 of a child safety seat 24 which is positioned on a passenger seat 26. In the depicted embodiment, energy-absorbing anchor 12 and tether 18 form the upper anchorage of the child safety seat restraint system.

As shown in FIGS. 2-5, energy-absorbing anchor 12 includes a bracket 52 having a base 54 configured to mount to a mounting portion of the vehicle, and further having a deformable structure 56 configured to couple to the child safety seat. When pulled in tension by loads on the child safety seat, the deformable structure 56 is configured to deform and transition from a retracted state (shown in FIG. 2) to an extended state (shown in FIGS. 4 and 5), thereby absorbing energy.

Deformable structure 56 may include a metal strap 58 that includes tearable portions that are configured to separate from base 54 along a length of metal strap 58 under a force, thereby absorbing energy, as discussed below. Metal strap may alternatively be referred to as a tab 58 when its length is relatively short, for example. Metal strap 58 may rise from base 54 and include a free end 62 that is formed opposite from the end of the strap that is fixed to the base. The metal strap may be curved between its free end 62 and fixed end, and in the depicted embodiment the metal strap is bent along a radius. Alternatively, the metal strap may include straight portions or be of another suitable shape. Further, free end 62 may include a connecting portion 68 that couples energy-absorbing anchor 12 to a tether of the child safety seat.

Figure 2:
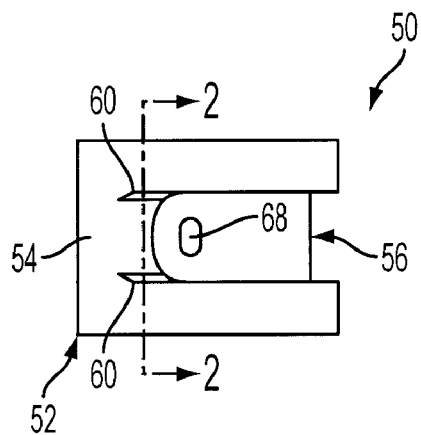
FIG. 2 is a top view of the energy-absorbing anchor of FIG. 1, shown in a retracted configuration in energy-absorbing anchor.
Figure 3:
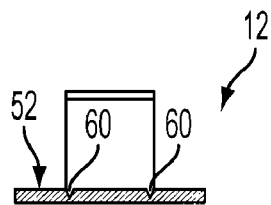
FIG. 3 is a cross-sectional view of the energy-absorbing anchor of FIG. 1, taken along line 2-2 of FIG. 2.
Figure 4:
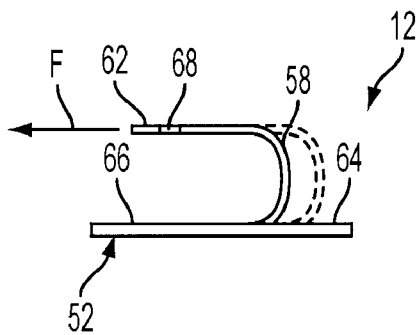
FIG. 4 is a side view of the energy-absorbing anchor of FIG. 1, shown in an extended configuration.
Figure 5:
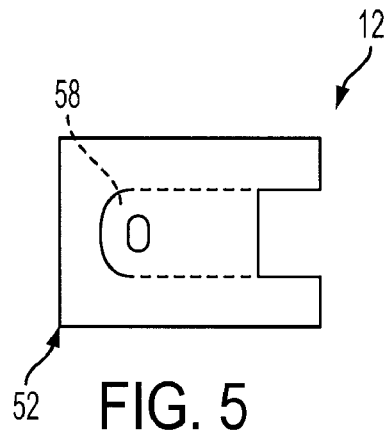
FIG. 5 is a top view of the energy-absorbing anchor of FIG. 1, shown in an extended configuration.

In some embodiments, the metal strap 58 is formed integrally with the base 54 from a single piece of metal. Base 54 may include a mechanism configured to facilitate energy absorbing separation of metal strap 58 from base 54. For example, as shown in FIGS. 2 and 3, one or more grooves 60 may be provided. The grooves may be V-shaped, and may extend along the sides of the fixed end of metal strap 58. The grooves are typically substantially parallel. It will be appreciated that other suitable shape, number, and position of grooves may be utilized. For example, the metal strap may tear from a side of the base and only one groove may be used.

Because the thickness of grooves 60 are smaller than that of the main body of base 54, the strength of the base along the grooves is weakened, and separation of the metal strap from the base along the grooves is promoted. The thickness or shape of the grooves may be adjusted to achieve a desired absorption of energy when a force is applied to the metal strap.

Energy-absorbing anchor 12 described above absorbs energy when a forced is applied to a child safety seat. During normal vehicle driving, metal strap 58 is sufficiently secured to base 54 to resist movement of the child safety seat so that metal strap 58 is maintained in a retracted configuration as shown in FIG. 2, even under heavy braking, for example. During a collision event, the inertia of the child safety seat system generates a forward force (F) applied to the energy-absorbing anchor as indicated by the arrow in FIGS. 4 and 5. When the force is below a predetermined level, which is set to be higher than forces experienced under even panic braking conditions, energy-absorbing anchor 12 may be maintained in the retracted configuration so that the child safety seat is inhibited from moving. However, as the force exceeds the predetermined level (e.g., when metal strap 58 is pulled by a force during a collision event), portions of metal strap 58 connected with base 54 are separated or torn off, and free end 62 of metal strap 58 moves away from rear end 64. As a result, metal strap 58 is transitioned from the retracted configuration shown in FIGS. 2 and 4 to an extended configuration shown in FIGS. 4 and 5. Separation of the metal strap from the base absorbs energy. In addition, metal strap 58 may be deformed as metal strap 58 is rolled along a radius under the impact force, thus further absorbing energy. Absorption of energy by the metal strap of the deformable structure can help reduce the impact forces experienced by the child safety seat.

It should be noted that the above embodiment is for exemplary purposes. Many variations are possible. For example, the metal strap may rise from the base to facilitate a coupling between the free end and a latchable portion of a tether of the child safety seat during a retracted configuration. The portion of the metal strap raised from the base may be flat or may have a curved shape. In another embodiment, the metal strap may be substantially in the same plane as the base in the retracted configuration. Further, in some embodiments, the configuration of the metal strap may be varied. The configurations that vary the strength of the metal strap include, but are not limited to, varied width or thickness along a length of the strap, and varied internal construction such as openings in the strap. Further, although the strap is described above as being metal, it will be appreciated that alternatively another suitable material that absorbs energy in deformation may be used.

The above described bracket 52 may be economically manufactured by stamping from a sheet of flat metal, scoring the grooves, and bending the metal strap back over itself to form the free end.

Figure 6:
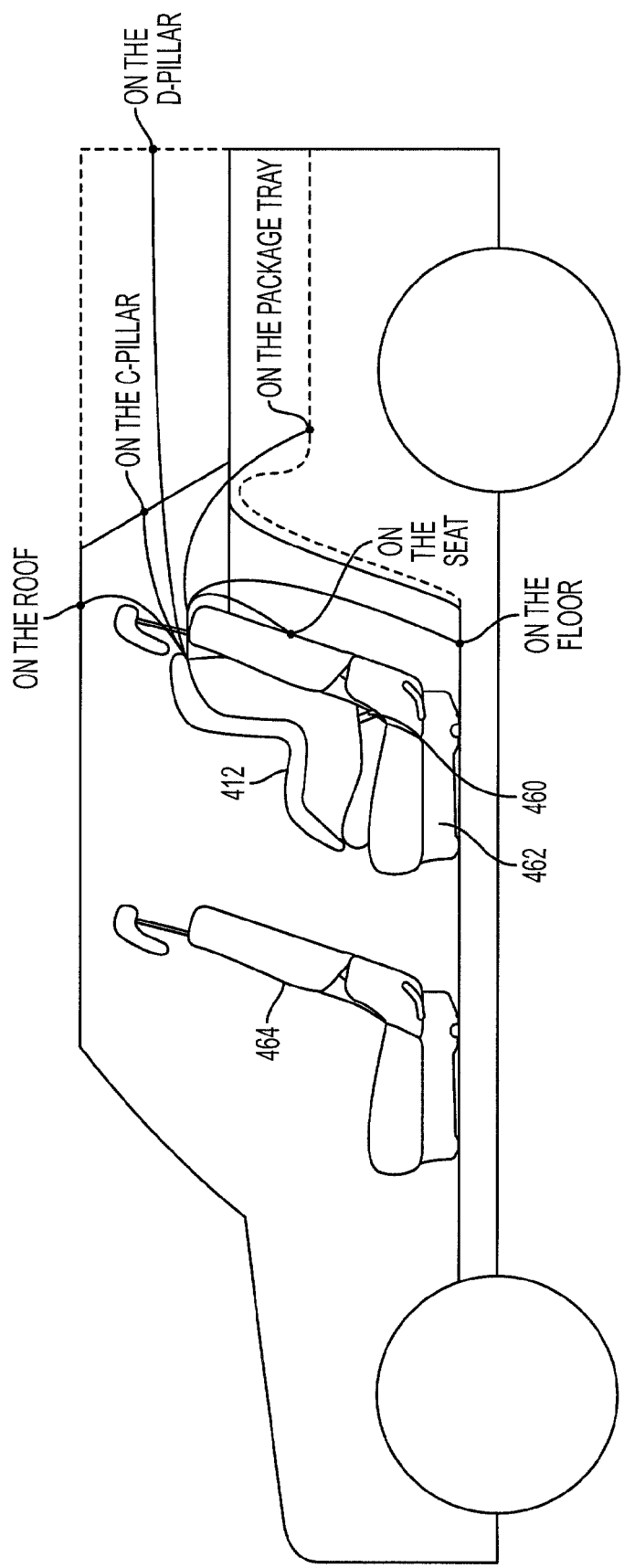
FIG. 6 is a cross-sectional view of a vehicle, schematically illustrating mounting portions in the vehicle to secure an energy-absorbing anchor which forms an upper anchorage and lower anchorage for a child safety seat.

FIG. 6 is a cross-sectional view of a vehicle having a driver seat 464, passenger seat 462, and child safety seat 412, schematically illustrating mounting portions of a vehicle chassis to which energy-absorbing anchor 12 may be secured when used as an upper anchorage or a lower anchorage for child safety seat 412. Energy-absorbing anchor 12 may be used in an upper anchorage for an upper tether of the child safety seat. The upper anchorage may be mounted at various portions of the vehicle. As shown in FIG. 6, the energy-absorbing anchor for the upper anchorage may be mounted on the package tray, roof, seat, floor, or C-pillar of a sedan type vehicle. The energy-absorbing anchor 12 for the upper anchorage may be further mounted on the D-pillar of a wagon as indicated by the vertical dashed line in FIG. 6. In some embodiments, energy-absorbing anchor 12 may be integrated with a panel of the vehicle. For example, energy-absorbing anchor 12 may be an integral part of a package tray.

Further, it will be appreciated that energy-absorbing anchor 12 may also be used as a lower anchorage. For example, energy-absorbing anchor 12 may be coupled to a lower end of child safety seat 412 and the mounting portion may be positioned in a bight 460, thereby forming a lower anchorage.

The embodiments of an energy-absorbing anchor described above have various advantages. Since the energy-absorbing characteristics are partially determined by the bond between the metal strap and the base through a coupling mechanism (e.g., grooves), the energy-absorbing anchor can be easily configured to achieve a desired load applied to the child safety seat by varying the bonding strength. For example, the shape of the grooves and the thickness of grooves that connects the metal strap may be varied to achieve the desired load. Further, in some embodiments, the configuration of the metal strap may be varied to adapt to load requirements. Thus, the energy-absorbing anchor can be adapted to different load requirements in a controlled matter.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various structures, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of methods and system component configurations, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A child safety seat restraint system of a vehicle, comprising:
    a tether having a first end attached to a child safety seat and a second end with a latchable structure; and
    an energy absorbing anchor including:
        a base having a front end, a rear end and two substantially parallel grooves, wherein the front end is coupled to a mounting portion of the vehicle;
        a tab between the two grooves, wherein the tab is substantially in a same plane as the base in a retracted state of the energy absorbing anchor when the tab is not under tension, and the tab includes a connection portion at the rear end to be coupled to the latchable structure of the tether;
        wherein, when the tab is pulled in tension, the tab is torn off from the grooves toward the front end of the base and transitioned from the retracted state to an extended state, thereby absorbing energy.

2. The child safety seat restraint system of claim 1, wherein the energy absorbing anchor is an integral part of a package tray of the vehicle wherein the package tray is a mounting portion of the child safety seat restraint system.

3. The child safety seat restraint system of claim 1, wherein a portion of the tab including a coupling structure rises off the base to facilitate coupling with the second end of the tether of the child safety seat.

4. The child safety seat restraint system of claim 1, wherein each of the grooves is formed of a V-shape.

5. The child safety seat restraint system of claim 1, wherein a shape of the grooves is adjusted to achieve a desired absorption of energy.

6. The child safety seat restraint system of claim 1, wherein the energy absorbing anchor is coupled to an upper end of the child safety seat, to thereby form an upper anchorage.

7. The child safety seat restraint system of claim 1, wherein the mounting portion of the vehicle is selected from the group consisting of a C-pillar, a D-pillar, a roof, a package tray, a seat, a seat frame, and a floor of the vehicle.

8. The child safety seat restraint system of claim 1, wherein the energy absorbing anchor is coupled to a lower end of the child safety seat and the mounting portion of the vehicle is positioned in a bight of a seat of the vehicle, thereby forming a lower anchorage.

9. A child safety seat restraint system of a vehicle, comprising:
   a tether having a first end attached to a child safety seat and a second end with a latchable structure; and
   an energy absorbing anchor including:
      a base having a front end, a rear end and two substantially parallel grooves, wherein the front end is coupled to a mounting portion of the vehicle;
      a tab between the two grooves, wherein the tab is substantially in a same plane as the base in a retracted state of the energy absorbing anchor when the tab is not under tension, and the tab includes openings and includes a connection portion at the rear end to be coupled to the latchable structure of the tether;
      wherein, when the tab is pulled in tension, the tab is torn off from the grooves toward the front end of the base and transitioned from the retracted state to an extended state, thereby absorbing energy.

10. The child safety seat restraint system of claim 9, wherein each of the grooves is formed of a V-shape.

11. The child safety seat restraint system of claim 9, wherein the grooves are formed in various shapes.

* * * * *